United States Patent [19]
Niikawa et al.

[11] Patent Number: 5,486,954
[45] Date of Patent: Jan. 23, 1996

[54] OPTICAL DEVICE HAVING AN OPTICAL LENS AND A MOUNTING ASSEMBLY

[75] Inventors: Tetsuji Niikawa; Hiromu Nakamura; Toshio Naiki; Jun Kohsaka, all of Toyokawa, Japan

[73] Assignee: Minolta Co., Ltd., Osaka, Japan

[21] Appl. No.: 177,263

[22] Filed: Jan. 4, 1994

Related U.S. Application Data

[62] Division of Ser. No. 619,898, Nov. 28, 1990, Pat. No. 5,301,060.

[30] Foreign Application Priority Data

Nov. 30, 1989 [JP] Japan ..................... 1-312951
Nov. 30, 1989 [JP] Japan ..................... 1-312952

[51] Int. Cl.[6] ............................... G02B 7/02
[52] U.S. Cl. ................. 359/818; 359/207; 359/711; 359/819
[58] Field of Search ................. 359/811, 815, 359/818–820, 822, 827, 642, 711, 718, 796, 205–206, 215, 207

[56] References Cited

U.S. PATENT DOCUMENTS

| | | | |
|---|---|---|---|
| 2,571,187 | 10/1951 | Baxter | 359/822 |
| 5,064,260 | 11/1991 | Shiraishi | 359/205 |
| 5,111,340 | 5/1992 | Kashima et al. | 359/819 |

FOREIGN PATENT DOCUMENTS

| | | |
|---|---|---|
| 54-68258 | 6/1979 | Japan . |
| 62-196601 | 8/1987 | Japan . |
| 62-173707 | 11/1987 | Japan . |
| 63-48510 | 3/1988 | Japan . |
| 63-50650 | 12/1988 | Japan . |
| 1316712 | 12/1989 | Japan . |

*Primary Examiner*—James Phan
*Attorney, Agent, or Firm*—Price, Gess & Ubell

[57] ABSTRACT

An optical device comprises an optical lens and a mounting assembly for securing the optical lens to a support surface. The optical lens has a longitudinal axis and has first and second projections; the mounting assembly includes a clamp member which has a clamp surface and depresses the optical lens downwardly through contact of the clamp surface with the optical lens so as to mount the optical lens on the support surface. The clamp member is formed, on the clamp surface, with first and second holes engageable with the first and second projections of the optical lens, respectively; the second hole is an elongated opening extending in the longitudinal direction of the optical lens.

9 Claims, 9 Drawing Sheets

OPTICAL DEVICE HAVING AN OPTICAL LENS AND A MOUNTING ASSEMBLY

This is a division of prior application Ser. No. 07/619,898, filed on Nov. 28, 1990, now U.S. Pat. No. 5,301,060.

BACKGROUND OF THE INVENTION

The present invention generally relates to optical elements and more particularly, to an optical element incorporated in a laser beam scanning optical device in which a laser beam is deflected by a deflector in a plane so as to form an image on a photosensitive member.

Recently, various laser beam scanning optical devices for writing images have been proposed for use in a laser beam printer, a facsimile machine, etc. In these known optical devices, optical elements such as a cylindrical lens, a toroidal lens, a reflecting mirror, etc. are employed and are frequently made of optical plastic in place of hitherto used optical glass. If the optical elements are made of plastic, such advantages are achieved that the optical elements can be produced at low cost by mass production based on injection molding and can be formed into desired shapes easily. On the other hand, optical plastic has such drawbacks as high sensitivity to change of temperature and low rigidity. Therefore, the optical elements made of optical plastic are required to be prevented from being deformed due to change of shape with time or mechanical stress produced at the time of mounting of the optical elements.

Meanwhile, a transmitting surface or a reflecting surface of the optical elements such as a lens, a mirror, etc. is required to be machined to high surface roughness. Thus, in the case where the optical elements are made of plastic material, various structural restrictions are imposed on the optical elements. For example, in the case of a long reflecting mirror, when vertically and horizontally extending reinforcing ribs are provided rearwards of a reflecting portion having a reflecting surface so as to reinforce the reflecting mirror mechanically, the reflecting portion provided with the reinforcing ribs is subjected to shrinkage at the time of molding of the reflecting mirror, thereby resulting in aggravation of accuracy of the reflecting surface. Therefore, in the prior art reflecting mirror, it was impossible to provide a reinforcing means even rearwards of the reflecting surface.

SUMMARY OF THE INVENTION

Accordingly, an essential object of the present invention is to provide an optical element made of plastic, which can be molded at high accuracy without being subjected to deformation and is free from deformation due to change of shape with time or mechanical stress produced at the time of mounting of the optical element.

In order to accomplish this object of the present invention, a mirror incorporated in an optical device and made of plastic, embodying the present invention comprises: an effective portion which has a constant thickness and a reflecting surface; and a reinforcing portion which is so provided as to enclose said effective portion and reinforces said effective portion from a periphery of said effective portion; said reinforcing portion being formed integrally with said effective portion; said reinforcing portion having a thickness equal to the thickness of said effective portion; said reinforcing portion having a constant width.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
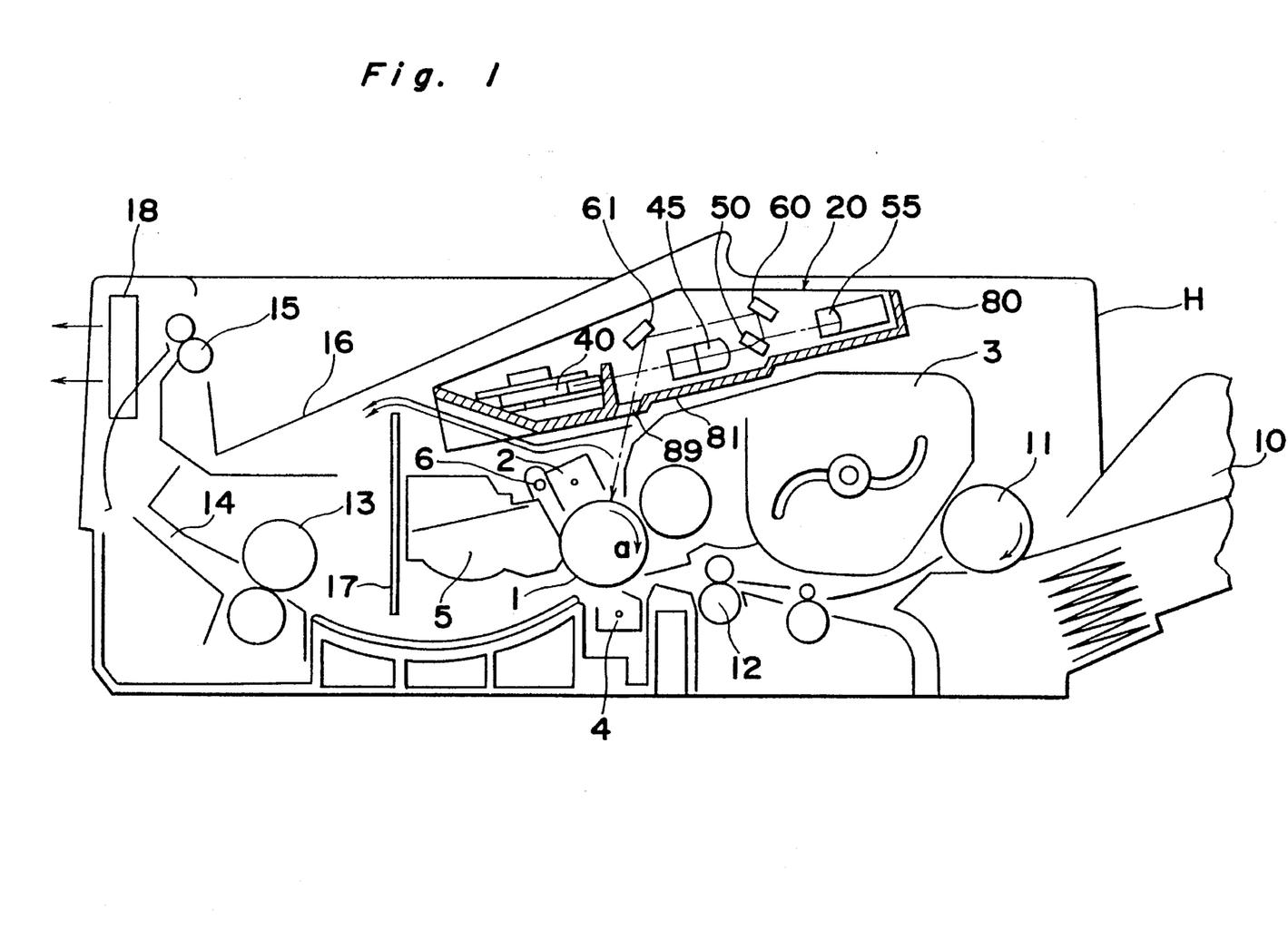
FIG. 1 is a schematic view of a laser printer provided with an optical unit incorporating optical elements of the present invention.

Referring now to the drawings, there is shown in FIG. 1, a laser printer provided with an optical unit 20 incorporating optical elements according to the present invention. A photosensitive drum 1 is rotatably provided at a substantially central portion of a printer housing H of the laser printer so as to be rotated in the direction of the arrow a. A corona charger 2, a developing device 3 of magnetic brush type, a transfer charger 4, a blade type cleaner 5 for removing residual toner and an erasure lamp 6 for erasing residual electric charge are provided around the photosensitive drum 1. Since arrangements and functions of these image forming elements are known, detailed description thereof is abbreviated for the sake of brevity.

Meanwhile, a stack of print paper sheets are stored in an automatic paper feeding cassette 10 and are sequentially fed leftwards in FIG. 1 one sheet by one sheet from an uppermost one of the stack of the print paper sheets upon rotation of a paper feeding roller 11. The fed print paper sheet is temporarily stopped by timing rollers 12 so as to be transported between the photosensitive drum 1 and the transfer charger 4 at a predetermined timing. An image is initially formed on the photosensitive drum 1 as a latent image by the optical unit 20 to be described in detail later and then, the latent image on the photosensitive drum 1 is developed into a visible toner image by the developing device 3. Thus, the visible toner image on the photosensitive drum 1 is transferred to the fed print paper sheet. Subsequently, the print paper sheet having the visible toner image transferred thereto is subjected to thermal fixing by a fixing device 13 and then, is ejected, through a passage 14, from outlet rollers 15 onto a tray 16 disposed at an upper portion of the printer housing H. The fixing device 13 includes rollers incorporating heaters and a fixing temperature of the fixing device 13 usually exceeds 150° C. Therefore, in this laser printer, interior of the printer housing H is partitioned by a heat shielding plate 17 and heated air in the printer housing H is discharged by a fan 18 such that rise in temperature in the printer housing H is minimized for the purpose of preventing rise in temperature of the optical unit 20 especially.

Figure 2:
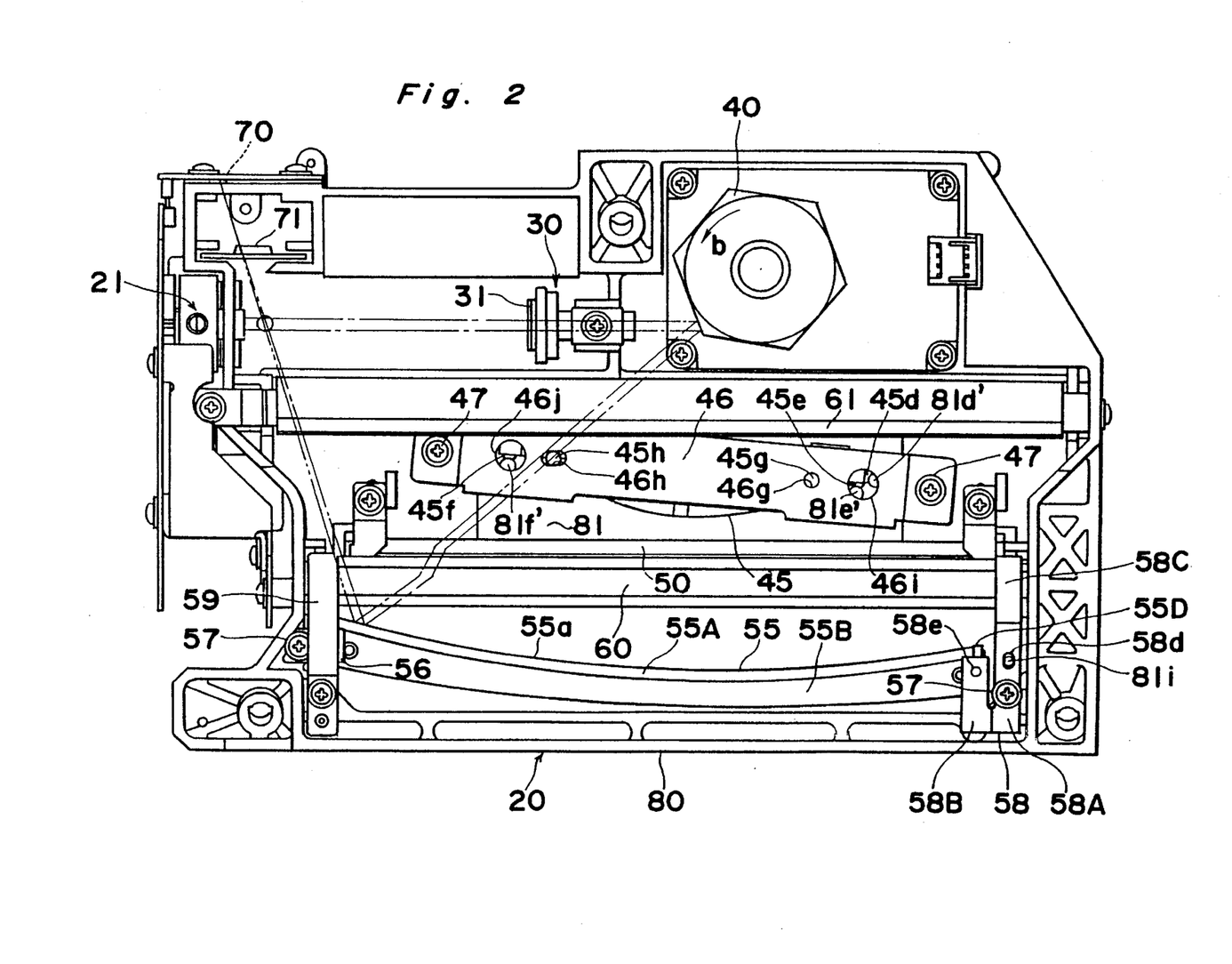
FIG. 2 is a top plan view showing the optical unit of FIG. 1 when an upper lid has been removed from the optical unit.
Figure 3:
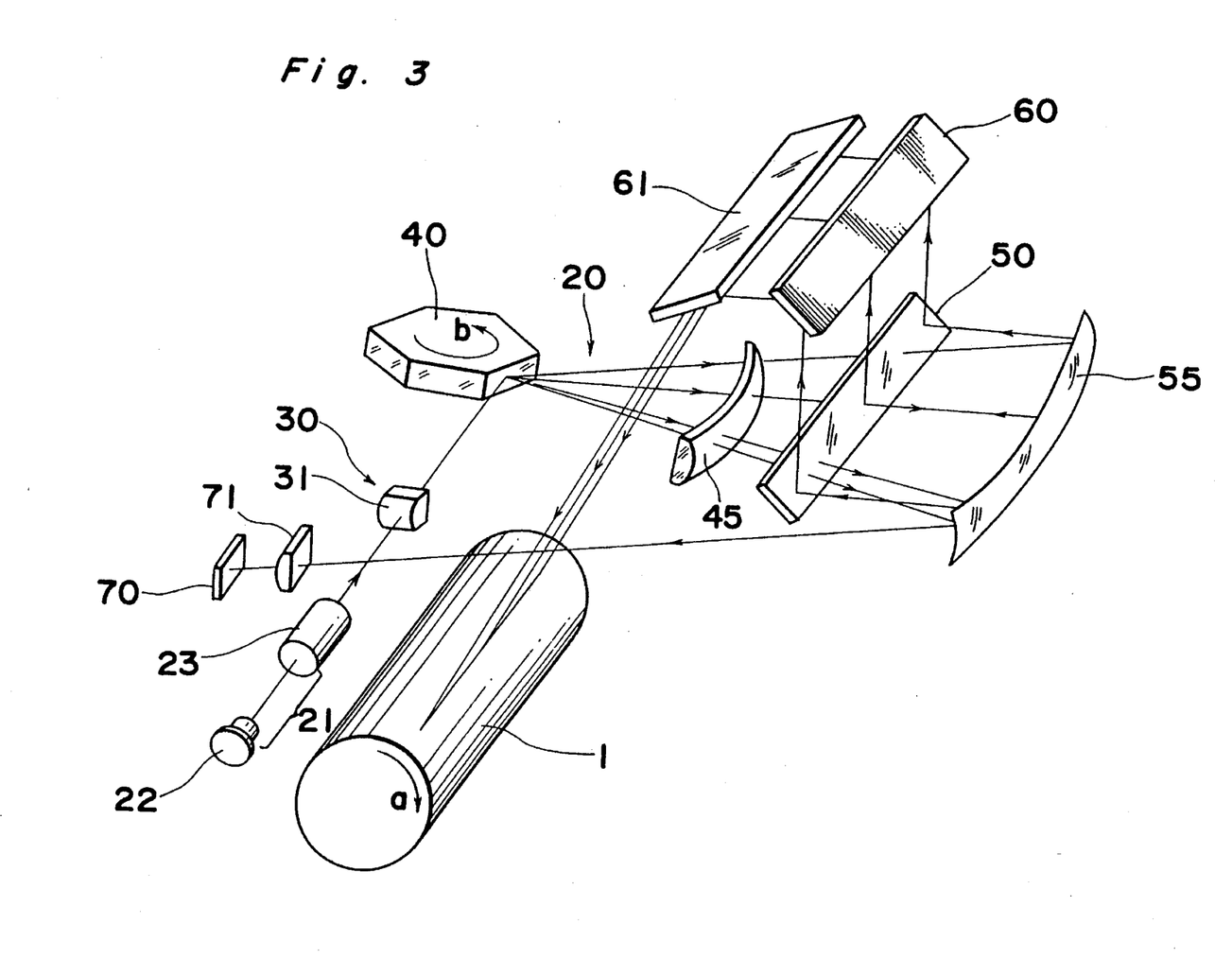
FIG. 3 is a perspective view showing a basic arrangement of the optical unit of FIG. 1.

As shown in FIGS. 2 and 3, the optical unit 20 is constituted by a light source assembly 21 incorporating a semiconductor laser 22 and a collimator lens 23, a cylindrical lens portion 30 incorporating a cylindrical lens 31, a polygon mirror 40, a toroidal lens 45, a half mirror 50, a spherical mirror 55, a first reflecting mirror 60, a second reflecting mirror 61, a photosensor 70 for detecting by a laser beam a position for starting writing of an image and a cylindrical lens 71 provided immediately before the photosensor 70. The above mentioned components of the optical unit 20 are accommodated in a unitary casing 80 formed by resin molding.

The semiconductor laser 22 is subjected to modulation (on-off) control on the basis of image data inputted to a controller (not shown) such that a laser beam is emitted from the light source assembly 21 at the time of ON of the semiconductor laser 22. The laser beam is converged into a convergent bundle of rays at a definite distance from the collimator lens 23 by the collimator lens 23 and a spot of the convergent bundle of rays is changed by the cylindrical lens 31 into a substantially linear shape extending longitudinally in parallel with a main scanning direction so as to reach the polygon mirror 40. The polygon mirror 40 is driven so as to be rotated in the direction of the arrow b at a constant speed. Upon rotation of the polygon mirror 40, the laser beam is deflected at an equiangular speed in a plane perpendicular to a rotational axis of the polygon mirror 40 so as to be guided to the toroidal lens 45.

A plane of incidence and a plane of outgoing of the toroidal lens 45 form concentric circles in a scanning cross section. The toroidal lens 45 has a predetermined power in a direction perpendicular to the plane of deflection of the polygon mirror 40 so as to correct inclination of the plane of deflection of the polygon mirror 40 in combination with the cylindrical lens 31. The laser beam is further transmitted through the half mirror 50 and is reflected by the spherical mirror 55. The reflected laser beam is reflected by the half mirror 50 upwardly and forms, through the first and second reflecting mirrors 60 and 61, an image on the photosensitive drum 1 from a slit 89 formed on a bottom wall 81 of the unitary casing 80. Formation of the image on the photosensitive drum 1 is performed by main scanning based on rotation of the polygon mirror 40 in the direction of the arrow b and auxiliary scanning based on rotation of the photosensitive drum 1 in the direction of the arrow a. The spherical mirror 55 has not only an fθ (distortion correcting) function for correcting a main scanning speed of the laser beam but a function for correcting curvature of field on the photosensitive drum 1. The half mirror 50 is used for the purpose of not only dividing an optical path such that an fθ optical system is constituted by a catoptric system but uniforming quantity of exposure.

Figure 4:
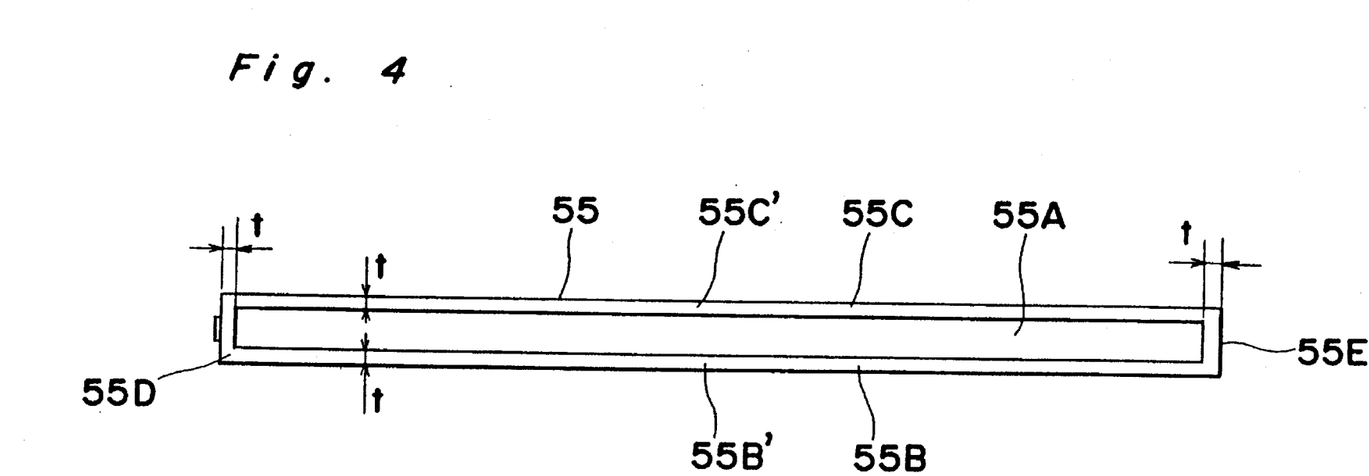
FIG. 4 is a rear elevational view of one of the optical elements of FIG. 1, a spherical mirror according to a first embodiment of the present invention.
Figure 5:
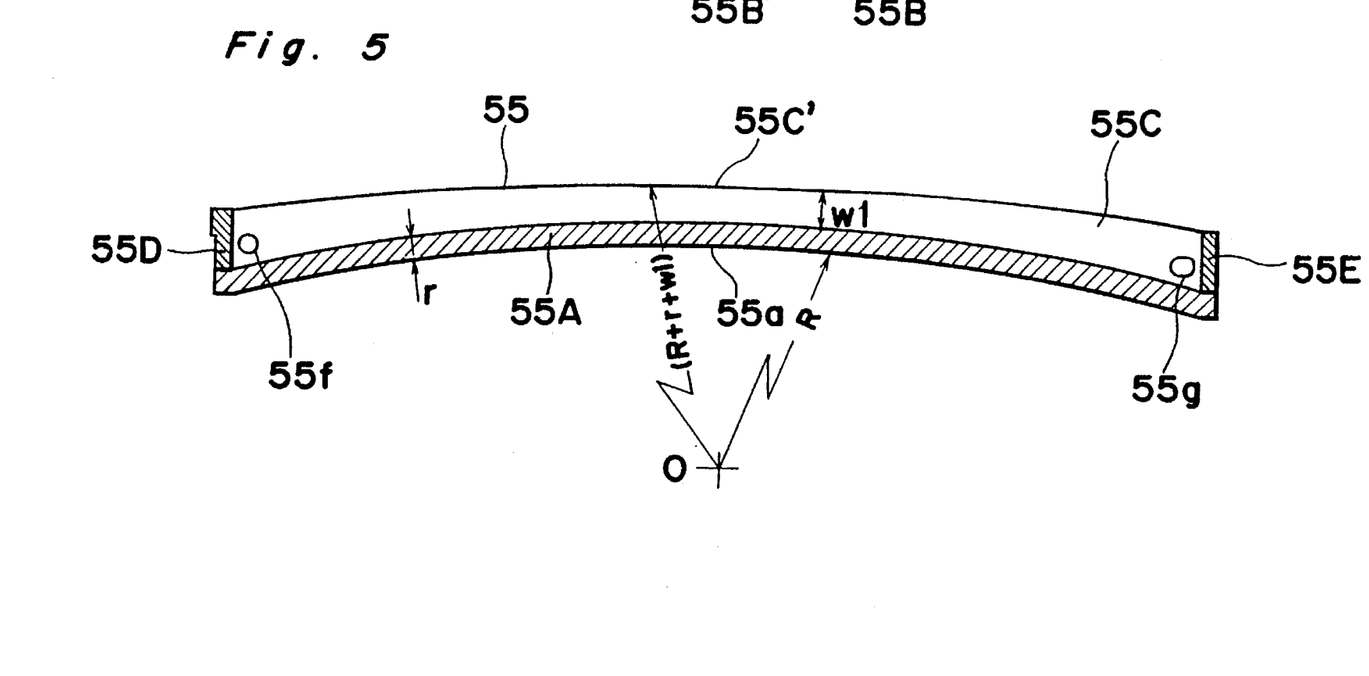
FIG. 5 is a sectional view of the spherical mirror of FIG. 4 as observed from above.
Figure 6:
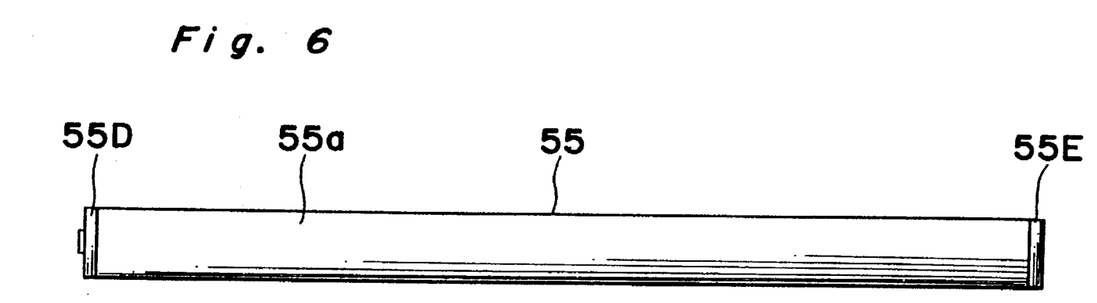
FIG. 6 is a front elevational view of the spherical mirror of FIG. 4.
Figures 7, 8:
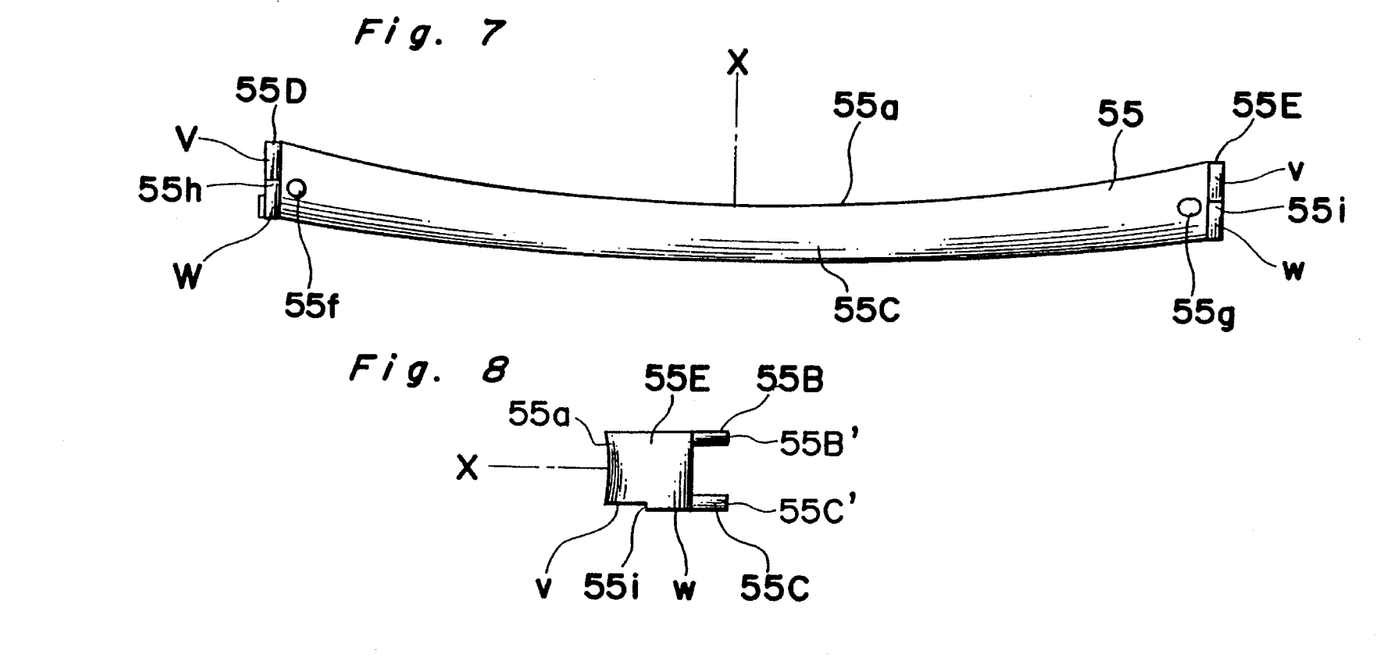
FIG. 7 is a bottom plan view of the spherical mirror of FIG. 4.
FIG. 8 is a right side elevational view of FIG. 6.

Hereinbelow, unitary optical elements of the present invention are described. As a first embodiment of the present invention, the spherical mirror 55 incorporated in the optical unit 20 is described with reference to FIGS. 4 to 8. FIG. 4 is a rear elevational view of the spherical mirror 55, FIG. 5 is a sectional view of the spherical mirror 55 as observed from above, FIG. 6 is a front elevational view of the spherical mirror 55, FIG. 7 is a bottom plan view of the spherical mirror 55 and FIG. 8 is a right side elevational view of FIG. 6. As shown in FIG. 4, the spherical mirror 55 is obtained by integral molding of plastic material and is constituted by an effective reflecting portion 55A, upper and lower reinforcing ribs 55B and 55C and left and right fixed ribs 55D and 55E. A reflecting surface 55a and a nonreflecting surface are, respectively, formed on opposite faces of the effective reflecting portion 55A. The upper and lower reinforcing ribs 55B and 55C extend at right angles to the left and right fixed ribs 55D and 55E relative to the reflecting surface 55a. Thus, in FIG. 4, the effective reflecting portion 55A occupies a rectangular area enclosed by inner edges of the ribs 55B to 55E. The ribs 55B to 55E have a constant thickness t and the thickness t of the ribs 55B to 55E is approximately equal to a thickness r of the effective reflecting portion 55A.

As shown in FIG. 5, a reflecting film made of aluminum or the like is formed on a front face of the effective reflecting portion 55A by deposition, etc. so as to act as the reflecting surface 55a. A hole 55f is formed at one end portion of the lower reinforcing rib 55C adjacent to the left fixed rib 55D, while an elongated opening 55g extending in a longitudinal direction of the spherical mirror 55 is formed at the other end portion of the lower reinforcing rib 55C adjacent to the right fixed rib 55E. Furthermore, the upper and lower reinforcing ribs 55B and 55C have a substantially constant width w1. Thus, the effective reflecting portion 55A has the constant thickness r and the upper and lower reinforcing ribs 55B and 55C have the constant width w1 as described above. Therefore, supposing in FIG. 5 that the reflecting surface 55a lies on a circle having a center O and a radius of R, outer peripheral edges 55B' and 55C' of the upper and lower reinforcing ribs 55B and 55C lie on a concentric circle relative to the circle of the reflecting surface 55a, namely lie on a circle having the center O and a radius of (R+r+w1).

As described above, the ribs 55B to 55E have the constant thickness t substantially equal to the thickness r of the effective reflecting portion 55A of the spherical mirror 55 and the ribs 55B and 55C have the constant width w1. The spherical mirror 55 reinforced by the ribs 55B to 55E of such shape as described above has an increased mechanical strength and is resistant against stress produced by curing shrinkage of the plastic material caused at the time of molding of the spherical mirror 55.

Meanwhile, the ribs 55B to 55E are so formed as not to project forwardly out of the reflecting surface 55a. Namely, the ribs 55B to 55E are provided rearwards of the reflecting surface 55a. Therefore, as shown in FIG. 6, a substantially whole area of the front face of the spherical mirror 55 can be effectively used as the reflecting surface 55a. In addition, when the reflecting film is formed on the front face of the effective reflecting portion 55A by deposition, etc. so as to obtain the reflecting surface 55a, the reflecting surface 55a is free from shadows produced if the ribs 55B to 55E project forwardly out of the reflecting surface 55a and can be uniformly formed on the front face of the effective reflecting portion 55A as a whole.

As shown in FIGS. 7 and 8, a small step 55h is formed at a central portion of a lower face of the left side fixed rib 55D and likewise, a small step 55i is formed at a central portion of a lower face of the right fixed rib 55E. Thus, stepped planes V and W are formed by the step 55h, while stepped planes v and w are formed by the step 55i. The stepped planes V, W, v and w extend in parallel with an optical axis X. The steps 55h and 55i are formed in a direction for releasing the spherical mirror 55 from a mold. Thus, even if a draft is not formed on the left and right fixed ribs 55D and 55E, the spherical mirror 55 can be easily separated from the mold by the steps 55h and 55i. Furthermore, the steps 55h and 55i not only improve positioning accuracy of the spherical mirror 55 but facilitate mounting operation of the spherical mirror 55 when the lower faces of the left and right fixed ribs 55D and 55E are placed on the bottom wall 81 of the unitary casing 80.

Figure 9:
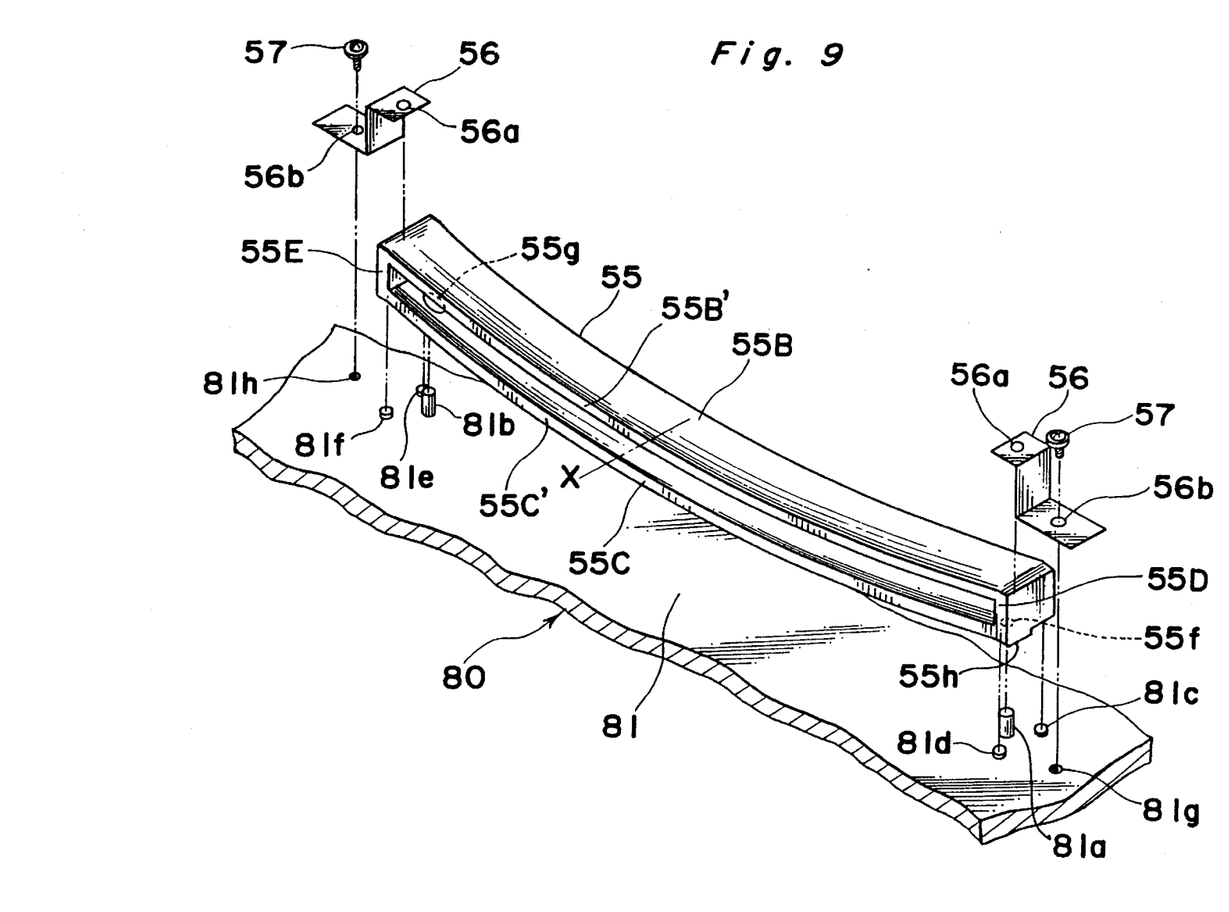
FIG. 9 is an exploded perspective view showing a first example of a mounting construction of the spherical mirror of FIG. 4.

Hereinbelow, a first example of mounting of the spherical mirror 55 of the above described arrangement on the bottom wall 81 of the unitary casing 80 is described with reference to FIGS. 9 to 11. Cylindrical minute projections 81c, 81d, 81e and 81f for placing the spherical mirror 55' thereon and cylindrical positioning projections 81a and 81b for positioning the spherical mirror 55 in a horizontal plane are provided on the bottom wall 81 of the unitary casing 80. The minute projections 81c to 81f have height smaller than that of the positioning projections 81a and 81b. The projection 81a is engaged, through loose fit, with the hole 55f formed at the one end portion of the lower reinforcing rib 55C. Meanwhile, the projection 81b is engaged, through loose fit in a direction parallel to the optical axis X, with the elongated opening 55g formed at the other end portion of the lower reinforcing rib 55C so as to be movable in the elongated opening 55g in the longitudinal direction of the spherical mirror 55. The opposite end portions of the spherical mirror 55 are, respectively, clamped to the bottom wall 81 by two clamp plates 56 such that the spherical mirror 55 is fixed to the bottom wall 81. The clamp plates 56 are each integrally formed by a steel sheet. A protrusion 56a is formed at one end portion of each of the clamp plates 56 so as to be pressed against the upper face of each of the left and right fixed ribs 55D and 55E. Meanwhile, a hole 56b for inserting a screw 57 therethrough is formed at the other end portion of each of the clamp plates 56.

In this mounting construction of the spherical mirror 55, the laser beam incident in the direction of the optical axis X is reflected by the effective reflecting portion 55A of the spherical mirror 55. Therefore, the positioning projections 81a and 81b disposed rearwards of the effective reflecting portion 55A do not intercept an optical path of the laser beam.

By the above mentioned mounting construction of the spherical mirror 55, the spherical mirror 55 is mounted on the bottom wall 81 as follows. Initially, the hole 55f and the elongated opening 55g of the spherical mirror 55 are, respectively, engaged with the positioning projections 81a and 81b of the bottom wall 81 and the lower faces of the left and right fixed ribs 55D and 55E, namely the stepped planes V and W of the left fixed rib 55D and the stepped planes v and w of the right fixed rib 55E are, respectively, brought into contact with the minute projections 81c, 81d, 81e and 81f. In this state, the spherical mirror 55 is placed on the bottom wall 81. Subsequently, the protrusion 56a of each of the clamp plates 56 is brought into contact with a central portion of the upper face of each of the left and right fixed ribs 55D and 55E and the screw 57 is screwed into each of threaded holes 81g and 81h of the bottom wall 81 through the hole 56b. During this screwing operation, the spherical mirror 55 is secured to the bottom wall 81 by the clamp plates 56 in a state where the spherical mirror 55 is urged towards the minute projections 81c, 81d, 81e and 81f by the clamp plates 56 and the spherical mirror 55 is positioned by the positioning projections 81a and 81b.

Figure 10:
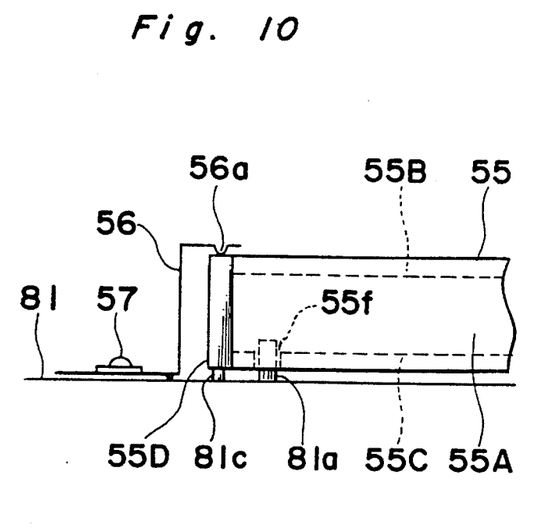
FIG. 10 is a fragmentary front elevational view of the mounting construction of FIG. 9.
Figure 11:
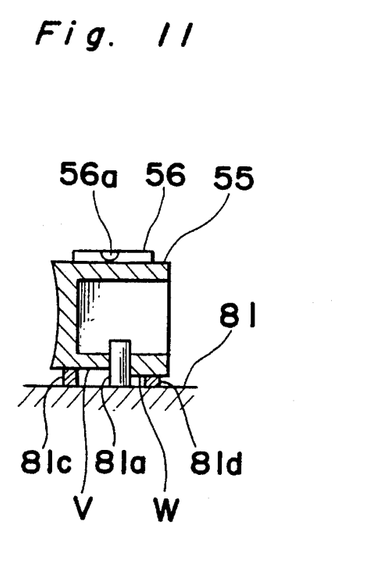
FIG. 11 is a sectional view taken at a right side portion of FIG. 9.

As shown in FIGS. 10 and 11, the central portion of the upper face of the left fixed rib 55D disposed at the left end of the spherical mirror 55 is elastically depressed by the clamp plate 56. This pressing force is substantially uniformly applied to the minute projections 81c and 81d held in contact with the stepped plane V and W of the lower face of the left fixed rib 55D, so that the left fixed rib 55D is stably secured to a predetermined position on the bottom wall 81 by the clamp plate 56 without production of any moment. Likewise, the right fixed rib 55E is also stably secured to the bottom wall 81 by the clamp plate 56.

Meanwhile, since the pressing force of the clamp plate 56 for pressing the spherical mirror 55 against the bottom wall 81 utilizes elasticity of the clamp plate 56 itself, a force for screwing the screw 57 into each of the threaded holes 81g and 81h is not directly applied to the spherical mirror 55 and thus, the spherical mirror 55 is secured to the bottom wall 81 by a force of proper magnitude. Therefore, the spherical mirror 55 is stably secured to the bottom wall 81 without being distorted.

The spherical mirror 55 is positioned on the bottom wall 81 in the direction of the optical axis X and in the direction perpendicular to the optical axis X by the positioning projections 81a and 81b, respectively.

Here, a case is described in which after the spherical mirror 55 has been secured to the bottom wall 81, the components of the optical unit 20 yield dimensional errors due to change of temperature in the printer housing H under their different coefficients of thermal expansion. Since each of the clamp plates 56 is merely held in contact, at a point, with each of the opposite end portions of the spherical mirror 55, effect of deformation or dimensional errors of the components of the optical unit 20 on the spherical mirror 55 and the clamp plates 56 is negligibly small. Thus, even if deformation of the components of the optical unit 20 is produced in the direction perpendicular to the optical axis X, the positioning projection 81b is displaced in the elongated opening 55g in the longitudinal direction of the spherical mirror 55 so as to absorb deformation or dimensional errors of the components of the optical unit 20 in the direction perpendicular to the optical axis X. On the other hand, the positioning projections 81a and 81b are fitted into the hole 55f and the elongated opening 55g loosely in the direction of the optical axis X as described above. Therefore, even if deformation of the components of the optical unit 20 is produced in the direction of the optical axis X, the positioning projections 81a and 81b are, respectively, slightly movable in the hole 55f and the elongated opening 55f in the direction of the optical axis X so as to absorb deformation or dimensional errors of the components of the optical unit in the direction of the optical axis X. By such deformation absorbing construction, the spherical mirror 55 is held at the set position on the bottom wall 81 highly accurately without being displaced against deformation of the components of the optical unit 20 due to change of temperature in the printer housing H and any stress due to deformation of the components of the optical unit 20 is not applied to the spherical mirror 55, so that optical characteristics of the spherical mirror 55 are not deteriorated.

Materials of the optical elements are as follows. The toroidal lens 45 is made of polymethyl methacrylate having a coefficient of linear expansion of $6 \times 10^{-5}/°C$. and a temperature change rate of $-8 \times 10^{-5} /°C$. of refractive index. The spherical mirror 55 is made of polycarbonate having a coefficient of linear expansion of $6.5 \times 10^{-5}/°C$. Meanwhile, the unitary casing 80 is made of fiber reinforcement type reinforced polycarbonate resin having a coefficient of linear expansion of $3 \times 10^{-5}/°C$. The polygon mirror 40 is made of aluminum and the mirrors 50, 60 and 61 are made of optical glass.

Figure 12:
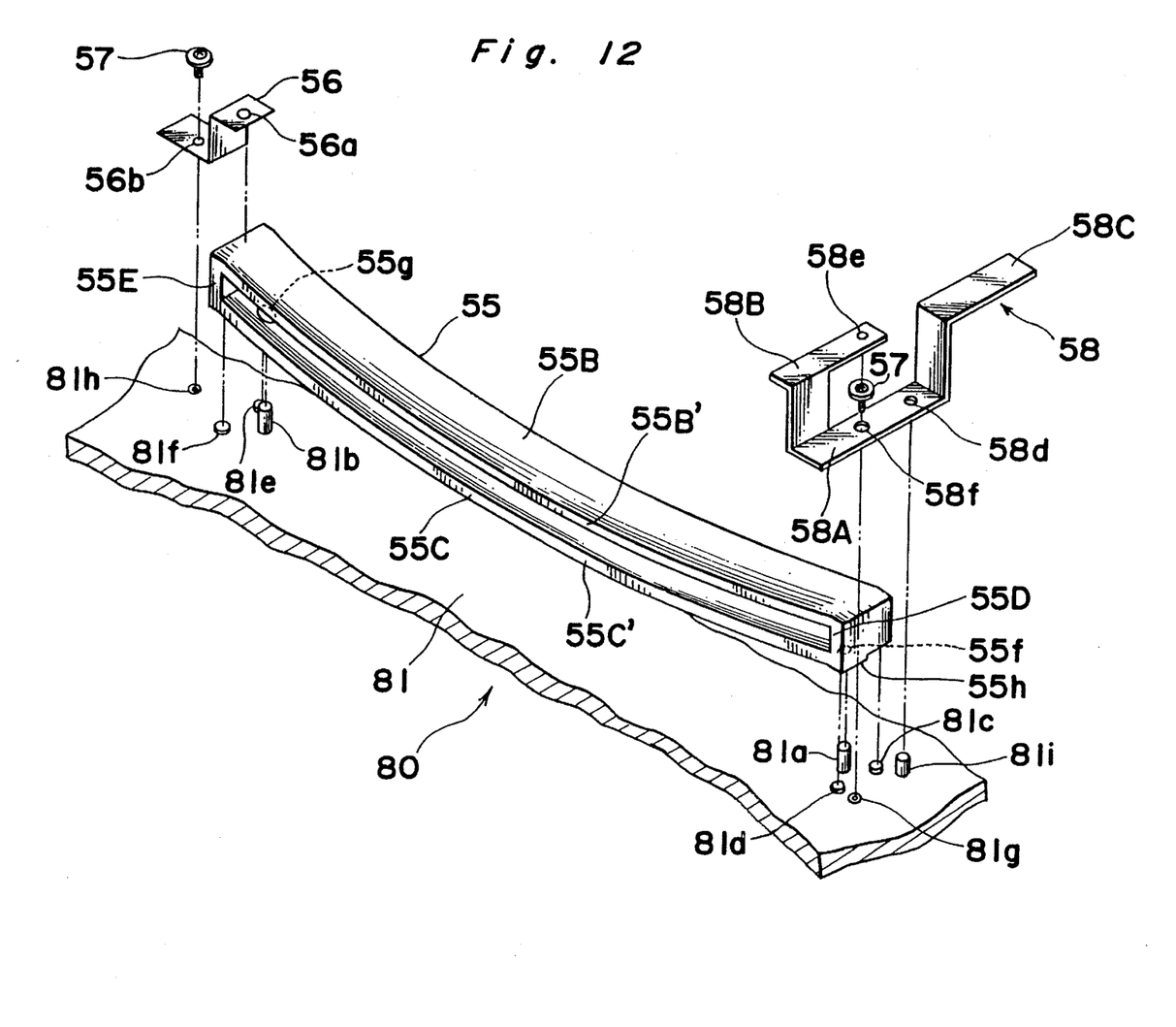
FIG. 12 is an exploded perspective view showing a second example of a mounting construction of the spherical mirror of FIG. 4.
Figure 13:
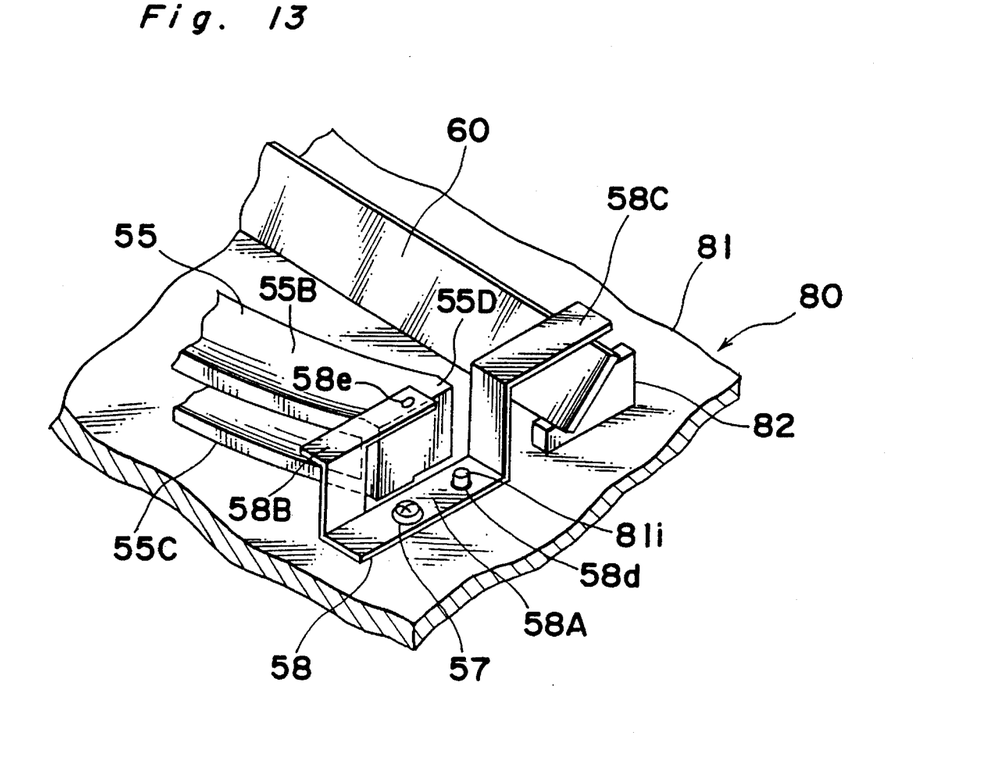
FIG. 13 is a fragmentary perspective view of FIG. 12.

FIGS. 12 and 13 show a second example of mounting of the spherical mirror 55 on the bottom wall 81 of the unitary casing 80. In this example, the two optical elements, e.g. the spherical mirror 55 and the first reflecting mirror 60 are simultaneously mounted on the bottom wall 81 by the clamp plate 56, a clamp plate 58 and a clamp plate 59 (FIG. 2). The spherical mirror 55 has the same construction as that of the first example of FIGS. 9 to 11. In addition to the positioning projections 81a and 81b and the minute projections 81c to 81e employed in the first example, a projection 81i for preventing rotation of the clamp plate 58 is formed on the bottom wall 81. The clamp plate 58 is provided for securing the spherical mirror 55 and the first reflecting mirror 60 to the bottom wall 81. The clamp plate 58 is constituted by a base portion 58A to be mounted on the bottom wall 81 and raised portions 58B and 58C for securing the spherical mirror 55 and the first reflecting mirror 60 to the bottom wall 81, respectively. A hole 58f for inserting the screw 57 therethrough is formed at a central portion of the base portion 58A and a hole 58d for receiving the projection 81i is formed at one end portion of the base portion 58A adjacent to the raised portion 58C. The raised portions 58B and 58C are provided at opposite ends of the base portion 58A, respectively. A protrusion 58e is formed at one end portion of the raised portion 58B so as to be pressed against the central portion of the upper face of the left fixed rib 55D. A distal end of the raised portion 58C extends forwardly such that an edge of an upper face of the first reflecting mirror 60 is depressed by the raised portion 58C. The first reflecting mirror 60 is placed on a pair of supports 82 provided on the bottom wall 81 so as to be inclined at a predetermined angle such that the longitudinal direction of the first reflecting mirror 60 extends at right angles to the optical axis X.

In the above described mounting construction of the second example, the spherical mirror 55 is placed on the bottom wall 81 in the same manner as in the first example. The first reflecting mirror 60 is placed on the supports 82 provided on the bottom wall 81. Subsequently, the screw 57 is screwed into the threaded hole 81g of the bottom wall 81 through the hole 58f of the clamp plate 58 in a state where the projection 81i of the bottom wall 81 is inserted through the hole 58d of the clamp plate 58 Rotation of the clamp plate 58 caused by screwing the screw 57 into the threaded hole 81g through the clamp plate 58 is prevented by engagement between the projection 81i and the hole 58d. During this screwing operation, the spherical mirror 55 and the first reflecting mirror 60 are secured to the bottom wall 81 in a state where the spherical mirror 55 and the first reflecting mirror 60 are urged towards the bottom wall 81 and positioned by the clamp plate 58.

The central portion of the upper face of the right fixed rib 55E is elastically depressed by the clamp plate 56 in the same manner as in the first example. Meanwhile, the central portion of the upper face of the left fixed rib 55D is elastically depressed by the clamp plate 58 such that the left fixed rib 55D is stably secured to a predetermined position on the bottom wall 81 without production of moment and distortion of the spherical mirror 55. The first reflecting mirror 60 is elastically depressed by the raised portion 58C of the clamp plate 58 so as to be secured to a predetermined position on the bottom wall 81 without production of moment and distortion of the first reflecting mirror 60. As shown in FIG. 2, a left end portion of the first reflecting mirror 60 is depressed by the clamp plate 59 so as to be secured to the bottom wall 81.

In the first and second examples referred to above, the hole 55f is provided at one end portion of the spherical mirror 55. However, it can also be so arranged that the hole 55f is formed at a central portion of the spherical mirror 55 and the two elongated openings 55g are, respectively, formed at opposite end portions of the spherical mirror 55. In this case, one positioning projection 81a corresponding to the hole 55f and two positioning projections 81b corresponding to the two elongated openings 55f are provided on the bottom wall 81.

Figure 14:
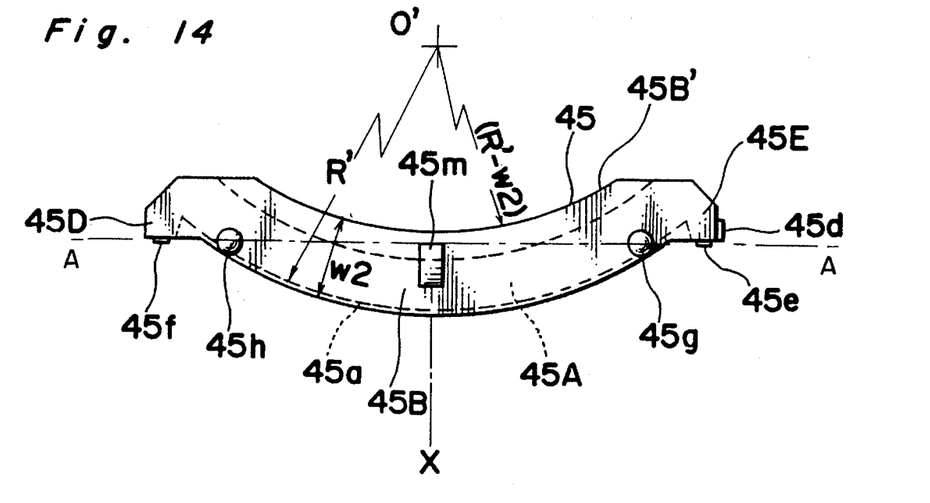
FIG. 14 is a top plan view of another of the optical elements of FIG. 1, a toroidal lens according to a second embodiment of the present invention.
Figure 15:
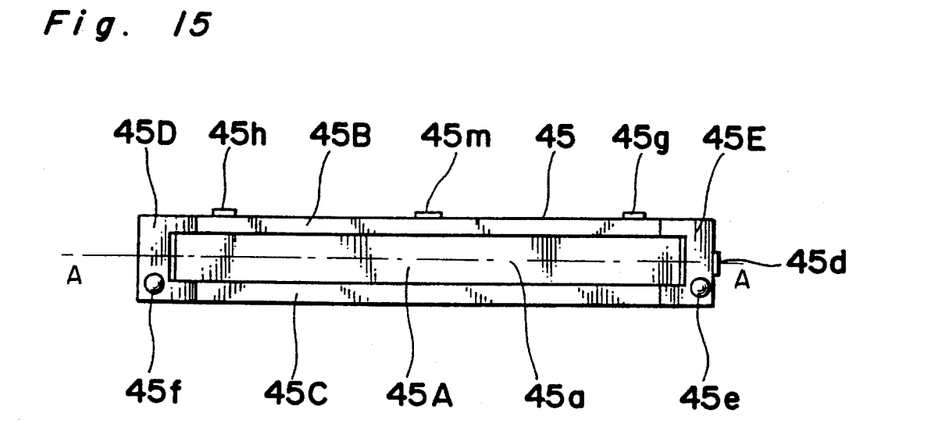
FIG. 15 is a front elevational view of the toroidal lens of FIG. 14.
Figure 16:
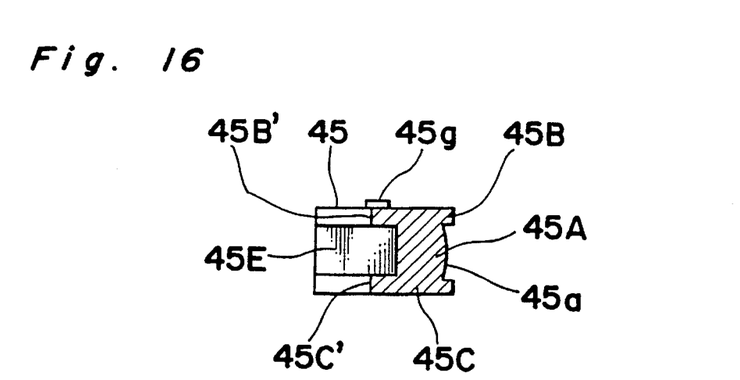
FIG. 16 is a sectional view of the toroidal lens of FIG. 14.

Hereinbelow, as a second embodiment of the present invention, the toroidal lens 45 incorporated in the optical unit 20 is described with reference to FIGS. 14 to 16. FIG. 14 is a top plan view of the toroidal lens 45 and FIG. 15 is a front elevational view of the toroidal lens 45. Mean while, FIG. 16 is a sectional view of the toroidal lens 45. As shown in FIGS. 15 and 16, the toroidal lens 45 is integrally molded by plastic material and is constituted by an effective lens portion 45A, upper and lower reinforcing ribs 45B and 45C and left and right fixed ribs 45D and 45E. The upper and lower reinforcing ribs 45B and 45C extend at right angles to the left and right fixed ribs 45D and 45E relative to a transmitting surface 45a of the effective lens portion 45A. Thus, in FIG. 15, the effective lens portion 45A occupies a rectangular area enclosed by inner edges of the ribs 45B to 45E. The ribs 45B to 45E have a constant thickness. Cylindrical lugs 45g and 45h are, respectively, formed at opposite end portions of an upper face of the upper reinforcing rib 45B, while a rectangular lug 45m is formed at a central portion of the upper face of the upper reinforcing rib 45B. Furthermore; a cylindrical lug 45f is formed on the left fixed rib 45D, while cylindrical lugs 45d and 45e are formed on the right fixed rib 45E. The upper and lower reinforcing ribs 45B and 45C have a constant width w2. Therefore, supposing in FIG. 14 that the transmitting surface 45a lies on a circle having a center O' and a radius of R', inner peripheral edges 45B' and 45C' of the upper and lower reinforcing ribs 45B and 45C lie on a concentric circle relative to the circle of the transmitting surface 45a, namely lie on a circle having the center O' and a radius of about (R'-w2). The ribs 45B to 45E increase strength of the toroidal lens 45 and make the toroidal lens 45 resistant against stress produced by curing shrinkage of the plastic material caused at the time of molding of the toroidal lens 45.

Hereinbelow, mounting of the toroidal lens 45 of the above described arrangement on the optical unit 20 is described with reference to FIG. 2. Cylindrical minute projections (not shown) for placing the toroidal lens 45 thereon and cylindrical positioning projections 81d', 81e' and 81f' for positioning the toroidal lens 45 in a horizontal plane are provided on the bottom wall 81 of the unitary casing 80. The minute projections have height smaller than that of the positioning projections 81d' to 81e'. A clamp plate 46 is provided for fixing the toroidal lens 45 to the bottom wall 81 and is integrally formed by a steel sheet. The clamp plate 46 is formed with a hole 46g and an elongated opening 46h engageable with the lugs 45g and 45h of the toroidal lens 45, respectively. The clamp plate 46 is further formed with an inspection hole 46i for inspecting engagement between the lugs 45d and 45e of the toroidal lens 45 and the positioning projections 81d' and 81e', respectively and an inspection hole 46j for inspecting engagement between the lug 45f of the toroidal lens 45 and the positioning projection 81f'. The hole 46g is engaged with the lug 45g so as to restrict not only longitudinal displacement of the toroidal lens 45 in a direction away from the positioning projection 81d' but lateral displacement of the toroidal lens 45 in a direction away from the positioning projection 81e'. The hole 46g is so formed as to have a diameter equal to or greater than that of the lug 45g. The elongated opening 46h is engaged with the lug 45h in a direction parallel to the optical axis X such that the lug 45h is movable in the elongated opening 46h in the longitudinal direction of the toroidal lens 45.

In the above described mounting construction of the toroidal lens 45, the toroidal lens 45 is initially placed on the bottom wall 81 in a state where the toroidal lens 45 is brought into contact with the minute projections of the bottom wall 81 and the lugs 45d and 45e of the right fixed rib 45E and the lug 45f of the left fixed rib 45D are brought into contact with the positioning projections 81d', 81e' and 81f', respectively. Subsequently, the hole 46g and the elongated opening 46h of the clamp plate 46 are, respectively, brought into engagement with the lugs 45g and 45h of the toroidal lens 45 and the clamp plate 46 is secured to the bottom wall 81 by two screws 47. During this screwing operation of the screws 47, the toroidal lens 45 is secured to the bottom wall 81 by the clamp plate 46 in a state where the toroidal lens 45 is urged towards the positioning projections 81d', 81e' and 81f' through the lugs 45g and 45h by the clamp plate 46 and the toroidal lens 45 is positioned by the positioning projections 81d', 81e' and 81f'. An operator can visually inspect engagement between the toroidal lens 45 and the positioning projections 81d', 81e' and 81f' through the inspection holes 46i and 46J of the clamp plate 46. Since the toroidal lens 45 is reinforced by the ribs 45B to 45E formed integrally with the effective lens portion 45A, the toroidal lens 45 is not subjected to strain due to mechanical stress applied by the clamp plate 46.

The toroidal lens 45 is elastically depressed, at its central portion, by the clamp plate 46 through the lug 45m and thus, is stably secured to a predetermined position on the bottom wall 81 without production of moment. Meanwhile, the lugs 45g and 45h of the toroidal lens 45 are, respectively, brought into engagement with the hole 46g and the elongated opening 46h of the clamp plate 46 and the lugs 45e and 45f of the toroidal lens 45 are, respectively, brought into contact with the positioning projections 81e' and 81f', whereby the toroidal lens 45 is positioned at an outgoing side of the optical axis X. Meanwhile, the lug 45d of the toroidal lens 45 is brought into contact with the positioning projection 81d', whereby the toroidal lens 45 is positioned at a side of the right fixed rib 45E in the direction perpendicular to the optical axis X. In other words, the toroidal lens 45 is positioned in the two perpendicular directions in the horizontal plane on the bottom plate 81 by the positioning projections 81d' 81e' and 81f' In this case, the lug 45g and the hole 46g may be formed such that the lug 45g is merely fitted into the hole 46g, while the lug 45h and the elongated opening 46h may be formed such that the lug 45h is merely slidable in the elongated opening 46h. Thus, dimensional accuracy and positional accuracy of the lugs 45g and 45h and the hole 46g and the elongated opening 46h are not required to be so high.

Here, a case is described in which after the toroidal lens 45 has been secured to the bottom wall 81 by the clamp plate 46, the components of the optical unit 20 yield dimensional errors due to change of temperature in the printer housing H under their different coefficients of thermal expansion. Since the clamp plate 46 is merely held in contact, at a point, with each of the opposite ends of the toroidal lens 45, effect of deformation or dimensional errors of the components of the optical unit 20 on the toroidal lens 45 and the clamp plate 46 is negligibly small. Furthermore, even if deformation of the components of the optical unit 20 is produced in the direction perpendicular to the optical axis X, the lug 45h of the toroidal lens 45 is displaced in the elongated opening 46h in the longitudinal direction of the toroidal lens 45 so as to absorb deformation or dimensional errors of the components of the optical unit 20. On the other hand, even if deformation of the components of the optical unit 20 is produced in the direction of the optical axis X, the lugs 45g and 45h are, respectively, loosely fitted into the hole 46g and the elongated opening 46h, namely are not held in pressing contact with the hole 45g and the elongated opening 46h, respectively in the direction of the optical axis X, so that deformation or dimensional errors of the components of the optical unit 20 in the direction of the optical axis X are absorbed by loose fitting of the lugs 45g and 45h into the hole 46g and the elongated opening 46h, respectively. By such deformation absorbing construction, the toroidal lens 45 is held at the set position on the bottom wall 81 highly accurately without being displaced against deformation of the components of the optical unit 20 due to change of temperature in the printer housing H and any stress due to deformation of the components of the optical unit 20 is not applied to the toroidal lens 45, so that optical characteristics of the toroidal lens 45 are not deteriorated.

Meanwhile, in this embodiment, when the toroidal lens 45 has been secured to the bottom wall 81, the positioning projections 81d' and 81e', the lugs 45g and 45h and the positioning projection 81f' are arranged substantially in a line in the longitudinal direction of the toroidal lens 45. Thus, the toroidal lens 45 can be positively fixed to the bottom wall 81. Furthermore, since the toroidal lens 45 is movably supported except for the above mentioned positioning projections 81d', 81e' and 81f' and the lugs 45g and 45h, the toroidal lens 45 is held at the set position on the bottom wall 81 highly accurately against deformation of the components of the optical unit 20 due to change of temperature in the printer housing H and is desirably not subjected to stress produced by deformation of the components of the optical unit 20.

The optical elements of the present invention are not restricted to the spherical mirror 55 and the toroidal lens 45 of the first and second embodiments and can be changed variously. For example, the present invention may be applied to the cylindrical lens 31 in place of the spherical mirror 55.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical device comprising:

a base plate which has a mounting surface;

a lens which has an elongated transmitting surface and a pressing surface brought into pressing contact with the mounting surface of said base plate such that said lens is supported on the mounting surface;

said lens being provided, on a surface of said lens opposite to the pressing surface, with first and second projections; and a clamp member which has a clamp surface and depresses said lens downwardly through contact of the clamp surface with said lens so as to mount said lens on the mounting surface;

said clamp member being formed, on the clamp surface, with first and second holes engageable with said first and second projections of said lens, respectively;

the second hole being an elongated opening extending in a longitudinal direction of said lens.

2. An optical device as claimed in claim 1, wherein said lens is a toroidal lens molded by plastic and the transmitting surface has a predetermined curvature.

3. The optical device of claim 1 further comprising:

positioning projections provided on said base plate for alignment of said lens.

4. The optical device of claim 1 wherein said lens is formed with positioning lugs.

5. The optical device of claim 1 further including inspection holes in said clamp.

6. The optical device of claim 1 further including integral fixed reinforcement ribs mounted on either side of said lens.

7. The optical device of claim 1 further including means for absorption of dimensional errors resulting from heat effects.

8. The optical device of claim 1 further including a lug mounted on said lens for contact with said clamp member.

9. The optical device of claim 1 wherein said lens has upper and lower integral reinforcing ribs extending both forward and rearward of said-optical transmitting surface and respective side surfaces forming an open-sided configuration with said ribs.

\* \* \* \* \*